(12) United States Patent
Miller et al.

(10) Patent No.: US 7,268,094 B2
(45) Date of Patent: Sep. 11, 2007

(54) MIXED MATRIX MEMBRANE WITH SUPER WATER WASHED SILICA CONTAINING MOLECULAR SIEVES AND METHODS FOR MAKING AND USING THE SAME

(75) Inventors: Stephen J. Miller, San Francisco, CA (US); Lun-Teh Yuen, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 243 days.

(21) Appl. No.: 10/643,555

(22) Filed: Aug. 18, 2003

(65) Prior Publication Data

US 2005/0043167 A1    Feb. 24, 2005

(51) Int. Cl.
*B01J 35/02* (2006.01)
(52) U.S. Cl. ............... 502/4; 502/60; 502/62
(58) Field of Classification Search ............ 502/4, 502/60, 62
See application file for complete search history.

(56) References Cited

U.S. PATENT DOCUMENTS

| | | | |
|---|---|---|---|
| 3,567,632 A | | 3/1971 | Richter et al. |
| 4,230,463 A | | 10/1980 | Henis et al. |
| 4,544,538 A | | 10/1985 | Zones |
| 4,683,214 A | * | 7/1987 | Angevine et al. ............ 502/66 |
| 4,728,345 A | | 3/1988 | Murphy |
| 4,876,228 A | * | 10/1989 | Chang et al. ................ 502/71 |
| 4,925,459 A | | 5/1990 | Rojey et al. |
| 5,085,676 A | | 2/1992 | Ekiner et al. |
| 5,104,532 A | | 4/1992 | Thompson et al. |
| 5,127,925 A | | 7/1992 | Kulprathipanja et al. |
| 5,234,471 A | | 8/1993 | Weinberg |
| 5,288,304 A | | 2/1994 | Koros et al. |
| 5,430,218 A | | 7/1995 | Miller et al. |
| 5,948,383 A | * | 9/1999 | Kuznicki et al. ............ 423/700 |
| 5,998,686 A | * | 12/1999 | Clem et al. ................ 585/415 |
| 6,207,042 B1 | * | 3/2001 | Holtermann et al. ........ 208/139 |
| 6,500,233 B1 | * | 12/2002 | Miller et al. ................ 95/50 |
| 6,503,295 B1 | | 1/2003 | Koros et al. |
| 6,508,860 B1 | * | 1/2003 | Kulkarni et al. ............. 95/51 |
| 6,562,110 B2 | | 5/2003 | Koros et al. |
| 6,585,802 B2 | | 7/2003 | Koros et al. |
| 6,755,900 B2 | | 6/2004 | Koros et al. |
| 6,932,859 B2 | | 8/2005 | Koros et al. |
| 6,951,638 B1 | * | 10/2005 | Burgfels et al. ............ 423/709 |
| 2002/0077245 A1 | * | 6/2002 | Kuznicki et al. ............ 502/60 |
| 2002/0082460 A1 | | 6/2002 | Verduijn et al. ............ 585/475 |
| 2003/0013601 A1 | * | 1/2003 | Cheng et al. ................ 502/63 |
| 2003/0069449 A1 | | 4/2003 | Zones et al. |
| 2003/0089227 A1 | * | 5/2003 | Hasse et al. ................ 95/45 |
| 2003/0149321 A1 | * | 8/2003 | Mees et al. ................ 585/640 |

FOREIGN PATENT DOCUMENTS

JP        7-47232     *   2/1995

OTHER PUBLICATIONS

O'Brien, K.C., Koros, W.J., and Barbari, T.A., A New Technique for the Measurement of Mulicomponent Gas Transport Through Polymeric Films, *J. Membrane Sci.*, 29, 229-238 (1986).

Costello, L.M. and Koros, W.J., Temperature Dependence of Gas Sorption and Transport Properties in Polymers: Measurement and Applications, *Ind. Eng. Chem. Res.*, 31, 2708-2714 (1992).

\* cited by examiner

*Primary Examiner*—David Sample
(74) *Attorney, Agent, or Firm*—Richard J. Schulte

(57) ABSTRACT

The present invention provides a method for preparing silica containing molecular sieves which may be mixed with an organic polymer to create a mixed matrix membrane. Further, this invention includes a method of making such a mixed matrix membrane and the membrane itself. A process for separating component gases from a mixture using the subject mixed matrix membrane is also described. The method for preparing silica containing molecular sieves comprises super water washing silica containing molecular sieves to produce water washed molecular sieves which are substantially free of surface remnants. Super water washing also ideally lowers the concentration of alkali metals in the molecular sieves. The water washed sieves are sufficiently free of surface remnants such that when the water washed sieves are subjected to a Sieve Wash Conductivity Test, a wash filtrate is produced having a conductivity of less than 110 micro mhos/cm, more preferably less than 80 micro mhos/cm, even more preferably less than 50 micro mhos/cm, and most preferably less than 30 micro mhos/cm. It is believed that super washing the sieves to this degree will enhance, compared to conventional preparation techniques, the ability of the molecular sieves to bond with an organic polymer to form a highly selective and permeable mixed matrix membrane.

15 Claims, 1 Drawing Sheet

MIXED MATRIX MEMBRANE WITH SUPER WATER WASHED SILICA CONTAINING MOLECULAR SIEVES AND METHODS FOR MAKING AND USING THE SAME

TECHNICAL FIELD

This invention relates to mixed matrix membranes and methods for making the same, and more particularly, to those membranes having silica containing molecular sieves, such as zeolites, which are used to separate components of a gaseous mixture.

BACKGROUND OF THE INVENTION

Mixed matrix membranes have proven to be effective in separating gas components contained within a gaseous mixture. The mixed matrix membranes typically contain molecular sieves which are embedded within polymeric organic materials. Mixed matrix membranes exhibit the unusual effect that the selectivity of the combined molecular sieves and organic polymer are higher than that of the organic polymer alone.

An example of such a mixed matrix membrane is found in U.S. Pat. No. 5,127,925 to Kulprathipanji et al. Another exemplary patent is U.S. Pat. No. 4,925,459 to Rojey et al. which describes the use of molecular sieves supported by an organic polymer to create a membrane which is useful for the separation of gas components. In both patents, membranes utilize zeolites as a molecular sieve. Zeolites are silica containing molecular sieves which have a particularly highly ordered crystalline structure often with desirable pore sizes and shapes conducive for fluid separations.

An example of the preparation of a zeolite, i.e., SSZ-13, is taught in U.S. Pat. No. 4,544,538 to Zones. Another example of preparation of a zeolite, SSZ-62, is described in U.S. patent application Ser. No. 2003/0069449 to Zones et al. The disclosures found in each of these patent documents are hereby incorporated by reference in their entireties.

The manufacture of zeolites used in mixed matrix membranes may include the step of lowering the concentration of alkali metals in the zeolite by converting the zeolite to a hydrogen form. This is conventionally done by ion exchange, generally with ammonium cations. After ion-exchange, the zeolite is calcined to decompose the ammonium cations, thereby converting the zeolite from an ammonium form to the hydrogen form.

While this method of treating zeolite particles prior to their incorporation into an organic polymer may benefit membrane selectivity and/or permeability to a degree, there is a need to discover improved zeolites and methods of treating those zeolites to achieve even better separation performance. While improved performance could also be achieved by increasing the zeolite content in a membrane, technical difficulties in membrane preparation (e.g., fiber spinning) and membrane strength can limit the upper percentage of zeolites that can be added. Accordingly, finding a way to get more effective use from a given content of zeolite would have distinct advantages. Higher selectivity will mean less loss of potentially valuable retentate to a permeate stream of fluids being separated. Higher permeability will reduce the required membrane area, thereby reducing investment cost.

In converting zeolite to the hydrogen form, it has been found that if ammonium cations are not completely removed, the residual cations can partially restrict diffusion of a gas, e.g., $CO_2$, through pores in the zeolite, reducing membrane permeability and selectivity. Second, complete removal of the ammonium cations is difficult, requiring calcination at temperatures above 400° C., generally above 450° C. or even 500° C. This high temperature calcination can degrade certain properties of zeolites. While not wishing to be bound by theory, this could potentially include dehydroxylation of silanol groups at the surface of the zeolite, where these groups are necessary for a high degree of attachment of silating agents. These silating agents can provide a bonding link between the zeolite and the membrane polymer phase. Without this link, gas may bypass the zeolite particles, diminishing separation selectivity. Other linking methods via surface silanol groups are also possible, such as through reactive groups in the polymer itself. Again, a decrease of these silanol groups would negatively impact that linking.

Another factor which could decrease zeolite effectiveness is residual amorphous siliceous material at the surface of the zeolite which could block surface sites and/or diminish diffusion of gases through the zeolite. Calcining the zeolite to remove the organic template prior to implementing procedures designed to remove amorphous material could anchor the amorphous material at the zeolite surface, making it difficult to remove and leading to poorer membrane performance. Blocking of surface sites could also lead to a diminishing of the surface charge (Zeta-potential) of the zeolite, making the zeolite particles easier to agglomerate during membrane formation which could also lead to poorer membrane performance.

Thus, there is a need to produce mixed matrix membranes with higher permeability and selectivity for a given loading of molecular sieves. The present invention addresses this need by overcoming some of the above described shortcomings of conventional mixed matrix membranes and in their manufacture.

SUMMARY OF THE INVENTION

The present invention provides a method for preparing silica containing molecular sieves which may be mixed with an organic polymer to create a mixed matrix membrane. Further, this invention includes a method of making such a mixed matrix membrane and the membrane itself.

The method for preparing silica containing molecular sieves comprises super water washing silica containing molecular sieves to produce water washed molecular sieves which are substantially free of surface remnants. Super water washing ideally also lowers the concentration of alkali metals in the molecular sieves. The water washed sieves are sufficiently free of surface remnants such that when the water washed sieves are subjected to a Sieve Wash Conductivity Test, a wash filtrate is produced having a conductivity of less than 110 micro mhos/cm, more preferably less than 80 micro mhos/cm, even more preferably less than 50 micro mhos/cm, and most preferably less than 30 micro mhos/cm. It is believed that super washing the sieves to this degree will enhance, compared to conventional preparation techniques, the ability of the molecular sieves to bond with an organic material to form a highly selective and permeable mixed matrix membrane. The Sieve Wash Conductivity Test will be described in further detail below.

The silica containing molecular sieves used in this invention are selected for their pore and crystal structure such that when the molecular sieves are used in a mixed matrix membrane, the membrane will exhibit superior permeability and selectivity performance. It is believed this superior performance is, in part, due to the super water washing of the molecular sieves, during preparation of the membranes.

The method for preparing silica containing molecular sieves comprises super water washing silica containing molecular sieves to produce water washed molecular sieves which are substantially free of surface remnants. Super water washing ideally also lowers the concentration of alkali metals in the molecular sieves.

The water washed sieves are sufficiently free of surface remnants such that when the water washed sieves are subjected to a Sieve Wash Conductivity Test, a wash filtrate is produced having a conductivity of less than 110 micro mhos/cm, more preferably less than 80 micro mhos/cm, even more preferably less than 50 micro mhos/cm, and most preferably less than 30 micro mhos/cm. After the super water washing, the sieve particles are thereafter dried and calcined at a temperature high enough to decompose any organic template, typically 450° C. to 700° C. It is believed that super washing the sieves to this degree will enhance, compared to conventional preparation techniques, the ability of the molecular sieves to bond with an organic material to form a highly selective and permeable mixed matrix membrane.

Mixed matrix membranes made in accordance with this invention may be used in a process for separating component gases of a gas mixture. The mixed matrix membranes comprise silica containing molecular sieves dispersed in a continuous phase of a polymer. The sieves have been sufficiently super water washed prior to being incorporated into the continuous phase to be substantially free of surface remnants, such that when subjected to a Sieve Wash Conductivity Test, a wash filtrate is produced having a conductivity of less than 110 micro mhos/cm, more preferably less than 80 micro mhos/cm, even more preferably less than 50 micro mhos/cm, and most preferably less than 30 micro mhos/cm. The gas mixture contacts one side of the membrane to cause the component gases to selectively permeate through the membrane. This allows a permeate gas composition enriched in concentration of at least one component gas to be removed from the opposite side of the membrane.

It is an object of this invention to produce a mixed matrix membrane which utilizes silica containing molecular sieves which have been super water washed prior to incorporation into an organic polymer carrier.

It is another object to super water wash, rather than use ammonium ion exchange, to lower the concentration of alkali metals in silica containing molecular sieves and to remove surface remnants such that pores of the molecular sieves are more resistant to blocking and the surfaces of the molecular sieves are more susceptible to attachment to a polymer phase when making a mixed matrix membrane.

Still another object is to increase the permeability and selectivity of a mixed matrix membrane made with a given loading of silica containing molecular sieves by employing super water washing rather than ammonium ion exchange to lower the concentration of alkali metals in the sieves and to remove surface remnants prior to calcining of the sieves.

BRIEF DESCRIPTION OF THE DRAWINGS

These and other objects, features and advantages of the present invention will become better understood with regard to the following description, pending claims and accompanying drawings where:

BEST MODE(S) FOR CARRYING OUT THE INVENTION

A. INTRODUCTION

Figure 1:
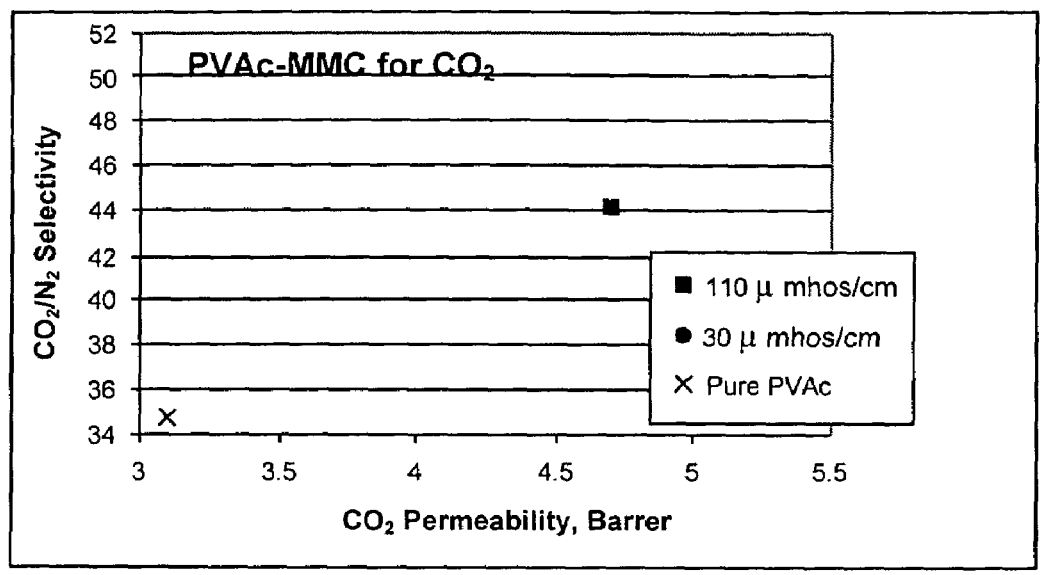
FIG. 1 is a graph of $CO_2/N_2$ selectivity vs. $CO_2$ permeability for PVAc-MMC films without molecular sieves and with ~15% (wt. %) H-SSZ-62 loading.

The present invention includes a method for making a mixed matrix membrane with super washed silica containing molecular sieves. First, the preparation and processing of the silica containing molecular sieves, including the super water washing of the molecular sieves, will be described. Next, the method of making mixed matrix membranes containing super washed silica containing molecular sieves will be discussed. Finally, specific examples of making silica containing molecular sieves, mixed matrix membranes including silica containing molecular sieves, and results of permeability and selectivity tests using the mixed matrix membranes for gas component separation will be presented.

B. PREPARATION AND PROCESSING OF SILICA CONTAINING MOLECULAR SIEVES

The silica containing molecular sieves to be used in this invention are selected for their pore and crystal characteristics such that when used in a mixed matrix membrane, the membrane will exhibit superior permeability and separation performance. It is believed this superior performance is, in part, also due to the super water washing of the sieves during preparation of the membranes. The super washing preferably replaces, or at least augments, conventional steps of ion exchanging used to lower alkali metal concentrations in silica containing molecular sieves. Also, by super water washing remnants from the sieves, pores remain open and surface charges are also believed to remain such that the sieves are less likely to agglomerate during membrane preparation. This surface preparation may lead to better bonding between the sieves and organic polymers thereby enhancing the selectivity and performance of mixed matrix membranes made using the super water washed sieves.

1. Preparation of SSZ-62

The most preferred silica containing molecular sieve to be used with the present invention is SSZ-62 and may be prepared as follows. A N,N,N-trimethyl-1-adamantammonium cation is used as a crystallization template or structure directing agent ("SDA"). In general, SSZ-62 is prepared by contacting an aluminum hydroxide gel dried to about 50 wt. % $Al_2O_3$ with a slight alkalinity and the ability to absorb $CO_2$ and solubilize rapidly in water, precipitated silica with a water content of about 5 to 15 wt. %, and a templating agent comprising a N,N,N-trimethyl-1-adamantammonium cation. SSZ-62 is prepared from a reaction mixture having the composition shown in Table 1 below. Silicon- and aluminum-containing reactants are expressed as $SiO_2$ and $Al_2O_3$, respectively.

TABLE 1

| | Reaction Mixture | |
|---|---|---|
| | Typical | Preferred |
| $SiO_2/Al_2O_3$ | 20-50 | 25-40 |
| OH—/$SiO_2$ | 0.15-0.40 | 0.25-0.40 |
| Q/$SiO_2$ | 0.10-0.35 | 0.18-0.22 |

TABLE 1-continued

| | Reaction Mixture | |
|---|---|---|
| | Typical | Preferred |
| $M_{2/n}/SiO_2$ | 0.05-0.20 | 0.12-0.18 |
| $H_2O/SiO_2$ | 10-25 | 12-20 | where Q is the SDA, M is alkali metal or alkaline earth metal, and n is the valence of M.

In practice, SSZ-62 is prepared by a process comprising:
a. preparing an aqueous solution containing an aluminum hydroxide gel dried to about 50 wt. % $Al_2O_3$ with a slight alkalinity and the ability to absorb $CO_2$ and solubilize rapidly in water, precipitated silica with a water content of about 5 to 15 wt. % and a N,N,N-trimethyl-1-adamantammonium cation having an anionic counterion which is not detrimental to the formation of SSZ-62;
b. maintaining the aqueous solution under conditions sufficient to form crystals of SSZ-62; and
c. recovering the crystals of SSZ-62.

The source of silicon is precipitated silica with a water content of about 5 to 15 wt. %. An example of such a material is HiSil 233 available from PPG Industries, Inc.

The source of aluminum is an aluminum hydroxide gel dried to about 50 wt. % $Al_2O_3$. The gel has slight alkalinity and is able to absorb $CO_2$. It is rapidly soluble in water. The aluminum hydroxide has a particle density of less than about 1.0 g/cm$^3$, preferably less than about 0.9 g/cm$^3$, more preferably less than about 0.8 g/cm$^3$, and most preferably in the range of about 0.1 g/cm$^3$ to about 0.8 g/cm$^3$. An example of such a material is Reheis F-2000 available from Reheis Chemical Co.

The aluminum hydroxide, as added to the reaction mixture, further has an average particle size of less than about 40 microns, preferably less than about 25 microns, more preferably less than about 15 microns, still more preferably less than about 10 microns, and most preferably within the range of about 0.1 to 10 microns, with preferably less than about 25% of the particulates having a particle size outside the range of about 0.1 to 40 microns. In a more preferred embodiment, less than about 25%, even more preferably less than 10%, of the particles have a particle size outside the range of about 0.1 to about 25 microns.

The aluminum hydroxide gel has a low alkali level before it is added to the reaction mixture. The gel contains less than about 0.12 wt. % and preferably less than 0.10 wt. % alkali. It is most preferred that the gel have an alkali content in the range of about 0.01 wt. % to about 0.10 wt. % where alkali may be one or more of the Group IA elements.

Typically, an alkali metal hydroxide and/or an alkaline earth metal hydroxide, such as the hydroxide of sodium, potassium, lithium, cesium, rubidium, calcium, and magnesium, is used in the reaction mixture; however, this component can be omitted so long as the equivalent basicity is maintained. The templating agent may be used to provide hydroxide ion. Thus, it may be beneficial to ion exchange, for example, the halide for hydroxide ion, thereby reducing or eliminating the alkali metal hydroxide quantity required. The alkali metal cation or alkaline earth cation may be part of the as-synthesized crystalline oxide material, in order to balance valence electron charges therein.

The SDA used to prepare SSZ-62 is a N,N,N-trimethyl-1-adamantammonium cation having the following structure:

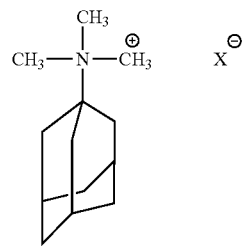

The anion (X$^-$) associated with the cation may be any anion which is not detrimental to the formation of the zeolite. Representative anions include halogen, e.g., fluoride, chloride, bromide and iodide, hydroxide, acetate, sulfate, tetrafluoroborate, carboxylate, and the like. Hydroxide is the most preferred anion.

The reaction mixture is maintained at an elevated temperature until the crystals of the SSZ-62 zeolite are formed. The hydrothermal crystallization is usually conducted under autogenous pressure, at a temperature between 100° C. and 200° C., preferably between 135° C. and 160° C. The crystallization period is typically greater than 1 day and preferably from about 3 days to about 20 days.

Preferably, the zeolite is prepared using mild stirring or agitation. During the hydrothermal crystallization step, the SSZ-62 crystals can be allowed to nucleate spontaneously from the reaction mixture. The use of SSZ-62 crystals as seed material can be advantageous in decreasing the time necessary for complete crystallization to occur. In addition, seeding can lead to an increased purity of the product obtained by promoting the nucleation and/or formation of SSZ-62 over any undesired phases. When used as seeds, SSZ-62 crystals are added in an amount between 0.1 and 10% of the weight of silica used in the reaction mixture.

For the purpose of this specification, a Sieve Wash Conductivity Test is conducted as follows. Ten (10) grams of the water washed molecular sieves (on a volatiles-free basis) are mixed with 250 mL of deionized water and kept at 95° C. in a closed Teflon bottle for 18 hours. Alkali ions, surface remnants, and other residuals may be released from the sieve particles into the deionized water at a relatively slow rate at room temperature. Accordingly, to insure that the sieve particles are sufficiently free of surface remnants and/or alkali ion, etc., this Sieve Wash Conductivity Test provides that the mixture of deionized water and sieve particles be kept at 95° C. in a closed Teflon bottle for 18 hours, to allow ions and particles to go into solution prior to conductivity being tested.

The mixture is then cooled to room temperature and filtered to produce a wash filtrate. The conductivity of the wash filtrate is measured using a conductivity meter (e.g., Cole-Parmer Model 1484-20). If the sieves have been sufficiently super water washed, then the conductivity of the wash filtrate should be below the aforementioned prescribed conductivity levels, i.e., below 110, 80, 50 or 30 micro mhos/cm.

The zeolites, after recovery and filtration, are preferably washed with water until the conductivity, measured at room temperature with a conductivity meter, falls below 110 micro mhos/cm, more preferably below 80 micro mhos/cm, even more preferably below 50 micro mhos/cm, and most preferably below 30 micro mhos/cm. The super water washing of the molecular sieves may take place in a single wash step. Alternatively, the super water washing may be done batchwise in several repeated cycles. Although not preferred, it is possible to wash the zeolites with a basic solution with a pH of at least 9, and more preferably at least 11 prior to beginning the super water washing process.

The zeolite is then dried and calcined at a temperature high enough to decompose any organic template, typically 450° C. to 700° C., preferably 500° C. to 650° C. It is preferred that the super water washing take place prior to the calcining step. This allows impurities to be washed away which otherwise might remain affixed to the molecular sieve due to the calcining step. The crystals are water-washed and then dried, e.g., at 90° C. to 150° C. for 8 to 24 hours, to obtain the as-synthesized SSZ-62 zeolite crystals. The drying step can be performed at atmospheric pressure or under vacuum.

SSZ-62 as prepared has a mole ratio of silicon oxide to aluminum oxide of greater than 10. SSZ-62 can also be made with a mole ratio of silicon oxide to aluminum oxide of at least 30. The crystallite size of SSZ-62, as determined by TEM, is less than 0.5 micron, and is preferably less than 0.1 micron.

The zeolite particle size can be reduced after synthesis such as by high shear wet milling. Prior to membrane formation, the zeolite may be silanated, either during wet milling or separately. It is believed that silanation permits improved bonding between the zeolite outer surface and the polymer. Suitable silane compounds include 3-aminopropyldimethylethoxysilane and 3-isocyanopropyidimethylchlorosilane. Silanation can be carried out, for example, by mixing the zeolite in an ethanol/water mixture containing the silane compound for a period of time (a few minutes up to a few hours), then recovering the treated zeolite and washing with ethanol to remove excess silane. For more details on the silanation, U.S. Pat. No. 6,508,860 may be reviewed, the teachings of which are hereby incorporated by reference in its entirety.

2. Preparation of SSZ-13

Another preferred silica containing molecular sieve which may be used in this invention is SSZ-13 zeolite. SSZ-13 zeolites can be suitably prepared from an aqueous solution containing sources of an alkali metal oxide, an organic compound, an oxide of aluminum or gallium, or mixture of the two, and an oxide of silicon or germanium, or mixture of the two. The reaction mixture should have a composition in terms of mole ratios of oxides falling within the following ranges:

TABLE 2

| | Reaction Mixture | |
|---|---|---|
| | Broad | Preferred |
| $YO_2/W_2O_3$ | 5-350 | 12-200 |
| $M_2O/W_2O_3$ | 0.5-20 | 1-17 |
| $R_2O/W_2O_3$ | 0.5-40 | 5-25 |
| $MCI/W_2O_3$ | 20-200 | 50-150 | wherein R is as disclosed below, Y is silicon, germanium or both, and W is aluminum, gallium or both. M is an alkali metal, preferably sodium or potassium. Typically, an alkali metal hydroxide or alkali metal halide is used in the reaction mixture; however, these components can be omitted so long as the equivalent basicity is maintained. The organic compound can provide hydroxide ion. The $OH^-/YO_2$ mole ratio to produce SSZ-13 having silica:alumina mole ratios of less than about 20:1 is above about 0.95 and is preferably in the range of 0.95 to 1.10. To prepare high silica content SSZ-13 the $OH^-/YO_2$ mole ratio is below about 0.95.

The organic component of the crystallization mixture is typically a bicyclo heteroatom compound. The heteroatom is preferably nitrogen. The preferred organic species are derivatives of either 1-adamantamine, 3-quinuclidinol, or 2-exo-aminonorbornane. The quaternary lower alkylammonium cation derivatives of these compounds are especially preferred. Methyl and other lower alkyl derivatives can be made using standard synthetic procedures.

The reaction mixture is prepared using standard zeolitic preparation techniques. Typical sources of aluminum oxide for the reaction mixture include aluminates, alumina, and aluminum compounds such as $AlCl_3$ and $Al_2(SO_4)_3$. Typical sources of silicon oxide include silicates, silica hydrogel, silicic acid, colloidal silica, tetraalkyl orthosilicates, and silica hydroxides. Gallium and germanium can be added in forms corresponding to their aluminum and silicon counterparts. Salts, particularly alkali metal halides such as sodium chloride, can be added to or formed in the reaction mixture. They are disclosed in the literature as facilitating the crystallization of zeolites while preventing silica occlusion in the lattice.

The reaction mixture is maintained at an elevated temperature until the crystals of the zeolite are formed. The temperatures during the hydrothermal crystallization step are typically maintained from about 100° C. to about 235° C., preferably from about 120° C. to about 200° C., and most preferably from about 130° C. to about 165° C. The crystallization period is typically greater than 3 days and preferably from about 7 days to about 50 days. The hydrothermal crystallization is conducted under pressure and usually in an autoclave so that the reaction mixture is subject to autogenous pressure. The reaction mixture can be stirred during crystallization. Once the zeolite crystals have formed, the solid product is separated from the reaction mixture by standard mechanical separation techniques such as filtration.

The zeolites, after recovery and filtration, are washed with water until the conductivity, measured at room temperature with a conductivity meter, falls below 110 micro mhos/cm, more preferably below 80 micro mhos/cm, even more preferably below 50 micro mhos/cm, and most preferably below 30 micro mhos/cm. The zeolite is then dried and calcined at a temperature high enough to decompose any organic template, typically 450° C. to 700° C., preferably 500° C. to 650° C.

The crystals are water-washed and then dried, e.g., at 90° C. to 150° C. for 8 to 24 hours, to obtain the as-synthesized, SSZ-13 zeolite crystals. The drying step can be performed at atmospheric or subatmospheric pressures.

During the hydrothermal crystallization step, the SSZ-13 crystals can be allowed to nucleate spontaneously from the reaction mixture. The reaction mixture can also be seeded with SSZ-13 crystals both to direct and accelerate the crystallization, as well as to minimize the formation of undesired aluminosilicate contaminants. If the reaction mixture is seeded with SSZ-13 crystals, the concentration of the organic compound can be greatly reduced or eliminated, but it is preferred to have some organic compound present, e.g., an alcohol.

The zeolite particle size can be reduced after synthesis such as by high shear wet milling. Prior to membrane formation, the zeolite may be silanated, either during wet milling or separately. It is believed that silanation permits improved bonding between the zeolite outer surface and the polymer. Suitable silane compounds include 3-aminopropyidimethylethoxysilane and 3-isocyanopropyidimethylchlorosilane. Silanation can be carried out, for example, by mixing the zeolite in an ethanol/water mixture containing the silane compound for a period of time (a few minutes up to a few hours), then recovering the treated zeolite and washing with ethanol to remove excess silane.

3. Other Molecular Sieve Candidates

Mixed matrix membranes utilizing molecular sieves containing significant quantities of silica are believed to benefit from the super water washing of the present invention. Along with zeolites, other molecular sieves which should benefit include silicoaluminophosphates (SAPOs).

Molecular sieves, both natural and synthetic, are well known and are described in the following, all of which are incorporated by reference in their entireties: W. M. Meier, D. H. Olson and Ch. Baerlocher in *Atlas of Zeolite Structure Types*, Elsevier, 4th Edition, London (1996), *Molecular Sieves, Principles of Synthesis and Identification* by R. Szostak (Van Nostrand Reinhold, 1989); and *Zeolite Molecular Sieves*, by D. Breck, John Wiley and Sons, 1973.

In all cases, a super washing step, instead of a cursory washing step, will be used to remove excessive residual remnants from the freshly formed and filtered zeolite crystals. This super washing step should significantly reduce amounts of harmful residual remnants remaining on the zeolite crystals. When these zeolite crystals are super washed and a Sieve Wash Conductivity Test is performed, the wash filtrate will have conductivity of less than 110 micro mhos/cm, more preferably below 80 micro mhos/cm, even more preferably below 50 micro mhos/cm, and most preferably below 30 micro mhos/cm. The zeolite is then dried and preferably calcined at a temperature high enough to decompose any organic template, typically 450° C. to 700° C., and more preferably 500° C. to 650° C. The molecular sieves are also ideally silanated as described above.

C. MAKING MIXED MATRIX MEMBRANE

1. Polymer Selection

An appropriately selected polymer can be used which permits passage of the desired gases to be separated, for example, carbon dioxide and methane. Preferably, the polymer permits one or more of the desired gases to permeate through the polymer at different diffusion rates than other components, such that one of the individual gases, for example, carbon dioxide, diffuses at a faster rate through the polymer. In a preferred embodiment, the rate at which carbon dioxide passes through the polymer is at least 10 times faster than the rate at which methane passes through the polymer.

For use in making mixed matrix membranes for separating $CO_2$ and $CH_4$, the most preferred polymers include Ultem® 1000, Matrimid® 5218, 6FDA/BPDA-DAM, 6FDA-6FpDA, and 6FDA-IPDA (all polyimides). Ultem® 1000 is a polyetherimide and is commercially available from General Electric Plastics. Matrimid® 5218 is made by Ciba. 6FDA/BPDA-DAM and 6FDA-IPDA are available from DuPont and are described in U.S. Pat. No. 5,234,471.

Examples of suitable polymers include substituted or unsubstituted polymers and may be selected from polysulfones; poly(styrenes), including styrene-containing copolymers such as acrylonitrilestyrene copolymers, styrene-butadiene copolymers and styrene-vinylbenzylhalide copolymers; polycarbonates; cellulosic polymers, such as cellulose acetate-butyrate, cellulose propionate, ethyl cellulose, methyl cellulose, nitrocellulose, etc.; polyamides and polyimides, including aryl polyamides and aryl polyimides; polyethers; polyetherimides; polyetherketones; poly(arylene oxides) such as poly(phenylene oxide) and poly(xylene oxide); poly(esteramide-diisocyanate); polyurethanes; polyesters (including polyarylates), such as poly(ethylene terephthalate), poly(alkyl methacrylates), poly(acrylates), poly(phenylene terephthalate), etc.; polypyrrolones; polysulfides; polymers from monomers having alpha-olefinic unsaturation other than mentioned above such as poly (ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly (vinyl acetate) and poly(vinyl propionate), poly(vinyl pyridines), poly(vinyl pyrrolidones), poly(vinyl ethers), poly(vinyl ketones), poly(vinyl aldehydes) such as poly (vinyl formal) and poly(vinyl butyral), poly(vinyl amides), poly(vinyl amines), poly(vinyl urethanes), poly(vinyl ureas), poly(vinyl phosphates), and poly(vinyl sulfates); polyallyls; poly(benzobenzimidazole); polyhydrazides; polyoxadiazoles; polytriazoles; poly (benzimidazole); polycarbodiimides; polyphosphazines; etc., and interpolymers, including block interpolymers containing repeating units from the above such as terpolymers of acrylonitrile-vinyl bromide-sodium salt of para-sulfophenylmethallyl ethers; and grafts and blends containing any of the foregoing. Typical substituents providing substituted polymers include halogens such as fluorine, chlorine and bromine; hydroxyl groups; lower alkyl groups; lower alkoxy groups; monocyclic aryl; lower acyl groups and the like.

It is preferred that the membranes exhibit a carbon dioxide/methane selectivity of at least about 5, more preferably at least about 10, and most preferably at least about 30. Preferably, the polymer is a rigid, glassy polymer as opposed to a rubbery polymer or a flexible glassy polymer. Glassy polymers are differentiated from rubbery polymers by the rate of segmental movement of polymer chains. Polymers in the glassy state do not have the rapid molecular motions that permit rubbery polymers their liquid-like nature and their ability to adjust segmental configurations rapidly over large distances (>0.5 nm). Glassy polymers exist in a non-equilibrium state with entangled molecular chains with immobile molecular backbones in frozen conformations. The glass transition temperature (Tg) is the dividing point between the rubbery or glassy state. Above the Tg, the polymer exists in the rubbery state; below the Tg, the polymer exists in the glassy state. Generally, glassy polymers provide a selective environment for gas diffusion and are favored for gas separation applications. Rigid, glassy polymers describe polymers with rigid polymer chain backbones that have limited intramolecular rotational mobility and are often characterized by having high glass transition temperatures (Tg>150° C).

In rigid, glassy polymers, the diffusion coefficient tends to dominate, and glassy membranes tend to be selective in favor of small, low-boiling molecules. The preferred membranes are made from rigid, glassy polymer materials that will pass carbon dioxide (and nitrogen) preferentially over methane and other light hydrocarbons. Such polymers are well known in the art and are described, for example, in U.S. Pat. No. 4,230,463 to Monsanto and U.S. Pat. No. 3,567,632 to DuPont. Suitable membrane materials include polyimides, polysulfones and cellulosic polymers.

2. Methods of Forming the Mixed Matrix Membrane

The mixed matrix membranes are typically formed by casting a homogeneous slurry containing particles and a desired polymer, as described above. The slurry can be mixed, for example, using homogenizers and/or ultrasound to maximize the dispersion of the particles in the polymer or polymer solution. The casting process is preferably performed by three steps:

a. pouring the solution onto a flat, horizontal surface (preferably glass surface),
b. slowly and virtually completely evaporating the solvent from the solution to form a solid membrane film, and
c. drying the membrane film.

To control the membrane thickness and area, the solution is preferably poured into a metal ring mold. Slow evaporation of the solvent is preferably effected by covering the area and restricting the flux of the evaporating solvent. Generally, evaporation takes about 12 hours to complete, but can take longer depending on the solvent used. The solid membrane film is preferably removed from the flat surface and placed in a vacuum oven to dry. The temperature of the vacuum oven is preferably set from about 50° C. to about 110° C. (or about 50° C. above the normal boiling point of the solvent) to remove remaining solvent and to anneal the final mixed matrix membrane.

The final, dried mixed matrix membrane can be further annealed above its glass transition temperature Tg. The Tg of the mixed matrix membrane can be determined by any suitable method (e.g., differential scanning calorimetry). The mixed matrix film can be secured on a flat surface and placed in a high temperature vacuum oven. The pressure in the vacuum oven (e.g., Thermcraft® furnace tube) is preferably between about 0.01 mm Hg to about 0.10 mm Hg. Preferably, the system is evacuated until the pressure is 0.05 mm Hg or lower. A heating protocol is programmed so that the temperature reaches the Tg of the mixed matrix membrane preferably in about 2 to about 3 hours. The temperature is then raised to preferably about 10° C. to about 30° C., but most preferably about 20° C., above the Tg and maintained at that temperature for about 30 minutes to about two hours. After the heating cycle is complete, the mixed matrix membrane is allowed to cool to ambient temperature under vacuum.

The resulting mixed matrix membrane is an effective membrane material for separation of one or more gaseous components from gaseous mixtures including the desired component(s) and other components. In a non-limiting example of use, the resulting membrane has the ability to separate carbon dioxide from methane, is permeable to these substances, and has adequate strength, heat resistance, durability and solvent resistance to be used in commercial purifications. While not wishing to be bound to a particular theory, the molecular sieves are believed to improve the performance of the mixed matrix membrane by including selective holes/pores with a size that permits carbon dioxide to pass through, but either not permitting methane to pass through, or permitting it to pass through at a significantly slower rate. The molecular sieves should have higher selectivity for the desired gas separation than the original polymer to enhance the performance of the mixed matrix membrane. For the desired gas separation in the mixed matrix membrane, it is preferred that the steady-state permeability of the faster permeating gas component in the molecular sieves be at least equal to that of the faster permeating gas in the original polymer matrix phase.

The membranes can be used in any convenient form such as sheets, tubes or hollow fibers. Hollow fibers can be preferred, since they provide a relatively large membrane area per unit volume. Sheets can be used to fabricate spiral wound modules familiar to those skilled in the art.

For flat-sheet membranes, the thickness of the mixed matrix selective layer is between about 0.001 and 0.005 inches, preferably about 0.002 inches. In asymmetric hollow fiber form, the thickness of the mixed matrix selective skin layer is preferably about 1,000 Angstroms to about 5,000 Angstroms. The loading of particles in the continuous polymer phase is between about 10% and 60%, preferably about 20% to 50% by volume.

3. Methods of Forming Hollow Fibers

Hollow fibers can be formed, for example, by extruding a polymer/molecular sieve mixture through a tubular capillary nozzle with a core fluid used for the purpose of retaining the hollow fiber shape. These fibers typically have the diameter of a human hair and offer the advantage of maximizing the surface area per unit volume. Industrial hollow fiber membrane modules typically contain hundreds of thousands of individual hollow fibers.

Specifically, to maximize productivity, the hollow fibers typically include an ultrathin (<2,000 Angstroms) "skin" layer on a porous support. Gas separation is accomplished through this selective "skin". This outer "skin" layer may be supported on the same polymer to form an integrally skinned asymmetric hollow fiber membrane. The most advanced membranes have an asymmetric sheath with the selective skin supported on an inexpensive porous core layer (different polymer) to form a composite hollow fiber membrane. This type of device is described in U.S. Pat. No. 5,085,676, the contents of which are hereby incorporated by reference. In the present invention, the selective outer skin or sheath is comprised of the molecular sieve membrane including the molecular sieves dispersed in a continuous phase polymer. The supportive core preferably does not contain sieves, but may.

Hollow fibers can be employed in bundled arrays potted at either end to form tube sheets and fitted into a pressure vessel thereby isolating the insides of the tubes from the outsides of the tubes. Devices of this type are known in the art. Preferably, the direction of flow in a hollow fiber element will be counter-current rather than co-current or even transverse. Such counter-current flow can be achieved by wrapping the hollow fiber bundle in a spiral wrap of flow-impeding material. This spiral wrap extends from a central mandrel at the center of the bundle and spirals outward to the outer periphery of the bundle. The spiral wrap contains holes along the top and bottom ends, whereby gas entering the bundle for tube side flow at one end is partitioned by passage through the holes and forced to flow parallel to the hollow fiber down the channel created by the spiral wrap. This flow direction is counter-current to the direction of flow inside the hollow fiber. At the bottom of the channels, gas re-emerges from the hollow fiber bundle through the holes at the opposite end of the spiral wrap and is directed out of the module.

D. MIXED MATRIX MEMBRANE ENHANCEMENT TEST

A test can be prepared to verify that the molecular sieves have been properly and successfully made to produce mixed matrix membranes with greatly enhanced permeation properties. This test involves preparation of a sample mixed matrix membrane film using a test polymer and a specified loading of molecular sieves, and comparing the $CO_2/CH_4$ permeation and selectivity versus a membrane film of the same test polymer without added sieves. The $CO_2/CH_4$ permeation selectivity is determined by taking the ratio of the permeability of $CO_2$ over that of $CH_4$. The permeability of a gas penetrant i is a pressure-and thickness-normalized flux of the component through the membrane and is defined by the expression:

$$P_i = \frac{N_i \cdot l}{\Delta p_i}$$

where $P_i$ is permeability of component i, l is thickness of the membrane layer, $N_i$ is component i's flux (volumetric flow rate per unit membrane area) through the membrane, and $\Delta p_i$ is the partial pressure driving force of component i (partial pressure difference between the upstream to the downstream). Permeability is often expressed in the customary unit of Barrer (1 Barrer=$10^{-10}$ $cm^3$ (STP)·cm/$cm^2$·s cm Hg). Permeability measurements can be made using a manometric, or constant volume, method. The apparatus for performing permeation measurements in films is described in O'Brien et al., *J. Membrane Sci.*, 29, 229 (1986) and Costello et al., *Ind. Eng. Chem. Res.*, 31, 2708 (1992), the contents of which are hereby incorporated by reference.

In the $CO_2/CH_4$ Mixed Matrix Enhancement Test, permeation tests of pure gases of $CO_2$ and $CH_4$ are performed on the mixed matrix membrane. The mixed matrix membrane film is separately tested with each gas using an upstream pressure of about 50 psig and a vacuum downstream. A temperature of about 35° C. is maintained inside the permeation system. Similar permeation tests of pure gases of $CO_2$ and $CH_4$ are performed on a prepared membrane film of the same test polymer without added sieves. To confirm that the molecular sieves particles have been properly prepared by the methods described herein, the mixed matrix membrane film should exhibit a $CO_2/CH_4$ selectivity enhancement in the $CO_2/CH_4$ Mixed Matrix Enhancement Test of 10% or more, preferably 15% or more, over the $CO_2/CH_4$ selectivity of the pure test polymer membrane alone.

The method for forming the sample mixed matrix membrane for use in the Enhancement Test is as follows:
1. The sieve is first silanated according to the following procedure:
   a. Prepare a 200 mL of 95:5 (by volume) solution of isopropyl alcohol (ACS certified grade or better) and DI water.
   b. Add the 4 grams silane coupling agent (3-aminopropyldimethylethoxysilane, APDMES is the standard) to the sieve (5 grams, based on dry weight) in a plastic container. Next, add the IPA solution prepared in step a.
   c. Sonicate the mixture with an ultrasonic horn for 30 minutes in five minute intervals (five minutes sonication followed by five minutes of resting).
   d. Filter the solution with a high pressure (~120 psi) nitrogen filtration setup (Pall Gelman #4280) using 0.2 µm PTFE filter paper.
   e. Once the filtration is complete, add 100 mL fresh IPA and sonicate the mixture above the paper, being careful not to contact the filter paper with the sonicator tip. This breaks up the cake so that excess APDMES is evenly washed off the surface. Repeat this procedure with two additional aliquots of IPA.
   f. Set the sieve aside until ready to incorporate into a film.
2. For the purpose of the Enhancement Test, the polymer to be used for the matrix phase is Ultem® 1000 (GE Plastics). Its chemical structure is shown below.

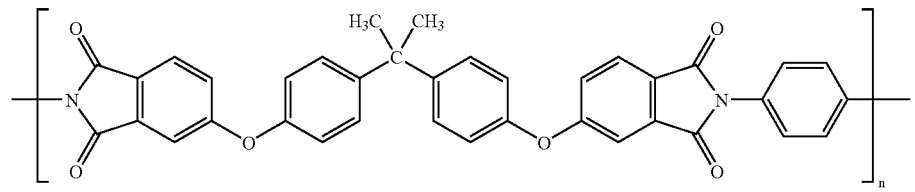

Dry the Ultem® 1000 and silanated zeolite in a vacuum oven at 120° C.
3. Prepare a 25 wt. % Ultem® 1000 solution in $CHCl_3$ and set aside until sieve priming is complete.
4. Disperse 1.5 grams of the silanated sieve and 0.2 grams Ultem® 1000 in 200 mL NMP(N-methyl pyrolidone) via sonication for two minutes in a round bottom flask. Maintain this mixture at 140° C. (oil bath) for four hours under a dry nitrogen purge, stirring constantly.
5. Filter the solution with 0.2 µm filter paper, wash the resulting cake three times with pure NMP, then dry overnight at 135° C. in a vacuum oven.
6. Disperse a portion of the sieve for two minutes via sonication in enough $CHCl_3$ so that the polymer-sieve-solvent system has 15% solids.
7. Add enough of the Ultem-$CHCl_3$ solution prepared in step 3 to give a 15:85 sieve:polymer mixture, then allow the solution to gently mix on a roller until it appears homogeneous. Remove the solution from the roller ten minutes before casting to allow any entrapped bubbles to escape.
8. Cast the solution on Teflon coated glass in a glove bag with a 10 mil casting knife with Al tape added to the bottom to increase the clearance to 16 mil. Cover with a funnel to control evaporation rate.
9. Remove the film carefully by pulling it off the surface, and dry it in an aluminum foil envelope in the vacuum oven at 180° C. for seven days.
10. To perform the Enhancement Test, permeability measurements of the flat mixed matrix membrane films are required. The measurements can be made using a manometric, or constant volume, method. A sample film area from final mixed matrix film is masked with adhesive aluminum masks having a circular, pre-cut, exposed area for permeation through the membrane. The masked membrane can be placed in a permeation cell and the permeation system. Both the upstream and downstream sections of the permeation system are evacuated for about 24 hours to 48 hours to remove ("degas") any gases or vapors sorbed into the membrane. Permeation tests of the membrane can be performed by pressurizing the upstream side with the desired gas at the desired pressure, in this test 50 psig with a temperature of 35° C. The permeation rate can be measured from the pressure rise of a pressure transducer and using the known downstream (permeate) volume. Following the permeation testing of a given gas, both the upstream and downstream sections are evacuated for at least 12 hours before permeation testing of the next gas.

With the above procedure, the $CO_2$ and $CH_4$ permeabilities are measured for the test mixed matrix membrane and the pure test polymer (Ultem® 1000). The $CO_2/CH_4$ selectivity of the mixed matrix membrane is compared to the $CO_2/CH_4$ selectivity of the pure test polymer (Ultem® 1000) alone. A $CO_2/CH_4$ selectivity enhancement of 10% or more should be observed in the mixed matrix membrane film.

E. SEPARATION SYSTEMS INCLUDING THE MEMBRANES

The membranes may take any form known in the art, for example, hollow fibers, tubular shapes, and other membrane shapes. Some other membrane shapes include spiral wound, pleated, flat sheet, or polygonal tubes. Multiple hollow fiber membrane tubes can be preferred for their relatively large fluid contact area. The contact area may be further increased by adding additional tubes or tube contours. Contact may also be increased by altering the gaseous flow by increasing fluid turbulence or swirling.

The preferred glassy materials that provide good gas selectivity, for example, carbon dioxide/methane selectivity, tend to have relatively low permeabilities. A preferred form for the membranes is, therefore, integrally skinned or composite asymmetric hollow fibers, which can provide both a very thin selective skin layer and a high packing density, to facilitate use of large membrane areas. Hollow tubes can also be used.

Sheets can be used to fabricate a flat stack permeator that includes a multitude of membrane layers alternately separated by feed-retentate spacers and permeate spacers. The layers can be glued along their edges to define separate feed-retentate zones and permeate zones. Devices of this type are described in U.S. Pat. No. 5,104,532, the contents of which are hereby incorporated by reference.

The membranes can be included in a separation system that includes an outer perforated shell surrounding one or more inner tubes that contain the mixed matrix membranes. The shell and the inner tubes can be surrounded with packing to isolate a contaminant collection zone.

In one mode of operation, a gaseous mixture enters the separation system via a containment collection zone through the perforations in the outer perforated shell. The gaseous mixture passes upward through the inner tubes. As the gaseous mixture passes through the inner tubes, one or more components of the mixture permeate out of the inner tubes through the selective membrane and enter the containment collection zone.

The membranes can be included in a cartridge and used for permeating contaminants from a gaseous mixture. The contaminants can permeate out through the membrane, while the desired components continue out the top of the membrane. The membranes may be stacked within a perforated tube to form the inner tubes or may be interconnected to form a self-supporting tube.

Each one of the stacked membrane elements may be designed to permeate one or more components of the gaseous mixture. For example, one membrane may be designed for removing carbon dioxide, a second for removing hydrogen sulfide, and a third for removing nitrogen. The membranes may be stacked in different arrangements to remove various components from the gaseous mixture in different orders.

Different components may be removed into a single contaminant collection zone and disposed of together, or they may be removed into different zones. The membranes may be arranged in series or parallel configurations or in combinations thereof depending on the particular application. The gaseous mixture can flow through the membrane(s) following an inside-out flow path where the mixture flows into the inside of the tube(s) of the membranes and the components which are removed permeate out through the tube.

Alternatively, the gaseous mixture can flow through the membrane following an outside-in flow path.

In order to prevent or reduce possibly damaging contact between liquid or particulate contaminates and the membranes, the flowing gaseous mixture may be caused to rotate or swirl within an outer tube. This rotation may be achieved in any known manner, for example, using one or more spiral deflectors. A vent may also be provided for removing and/or sampling components removed from the gaseous mixture.

The membranes are preferably durable, resistant to high temperatures, and resistant to exposure to liquids. The materials may be coated, ideally with a polymer, to help prevent fouling and improve durability. Examples of suitable polymers include those described in U.S. Pat. Nos. 5,288,304 and 4,728,345, the contents of which are hereby incorporated by reference. Barrier materials may also be used as a pre-filter for removing particulates and other contaminants which may damage the membranes.

Mixed matrix membranes made in accordance with this invention may be used in a process for separating component gases of a gas mixture. The mixed matrix membranes comprise silica containing molecular sieves dispersed in a continuous phase of a polymer. The sieves have been sufficiently super water washed prior to being incorporated into the continuous phase to be substantially free of surface remnants, such that when subjected to a Sieve Wash Conductivity Test, a wash filtrate is produced having a conductivity of less than 110 mhos/cm, more preferably less than 80 mhos/cm, even more preferably less than 50 mhos/cm, and most preferably less than 30 mhos/cm. The gas mixture contacts one side of the membrane to cause the component gases to selectively permeate the membrane. This allows a permeate gas composition enriched in concentration of at least one component gas to be removed from the opposite side of the membrane.

F. EXAMPLES

Example 1

Preparation of H-SSZ-62

H-SSZ-62 was Prepared According to the Following Procedure:

To a mixture of 1,836.2 grams of 0.64M N,N,N-trimethyl-1-adamantammonium hydroxide and of 3,336 grams deionized $H_2O$ were added 46.2 grams of sodium hydroxide solids (98%). This was stirred until the NaOH was dissolved. Then 28.35 grams of Reheis F-2000 alumina were added with continued stirring for another 30 minutes. Next, 342.2 grams of Cabosil M-5 were added with stirring. The mix was loaded into a stirred 5 gallon autoclave and run at 160° C. for four days. At the end of run, the reaction mixture had a final pH of 12.22. The mix was then filtered. The wet filter cake was then heated overnight at 90° C. in 1.5 liters of a 0.1 N NaOH solution to remove excess silica that did not get incorporated into the zeolite. (This corresponds to a pH of greater than 12.) The zeolite was separated by centrifugation, and then heated overnight at 90° C. in deionized water.

The zeolite was separated by centrifugation, and then washed repeatedly in deionized water until the wash water had a conductivity of 110 micro mhos/cm, measured at room temperature with a Cole-Parmer conductivity meter (Model 1484-20). The zeolite was further washed until the conductivity of the wash water was 30 micro mhos/cm or less. During washing, the Na content of the zeolite was reduced from 0.46 wt. % in the starting material to 0.36 wt. % in the final product. The zeolite was then dried overnight at 90° C. Particle size by SEM was about 0.1 to 0.5 microns. The dried zeolite was then calcined in air at 593° C. for five hours. Micropore analysis showed the zeolite had a micropore volume of 0.3 cc/g. The silica/alumina molar ratio of the zeolite by ICP was 29. The zeolite was then silanated with APDMES using 0.2% APDMES in isopropanol/water (95:5 VNV) and dried at 135° C. overnight. The zeolite was used to prepare an Ultem® 1000 mixed matrix membrane with 15 wt. % H-SSZ-62 zeolite content using the methods described above for the Mixed Matrix Membrane Enhancement Test.

Example 2

Permeation Testing

Permeability measurements were made using a manometric, or constant volume, method. The permeation tests were conducted in accordance with permeation test procedures described above in Section D.

The permeation properties of the neat Ultem® 1000 were determined using a gas mixture containing 10% $CO_2$ and 90% $CH_4$. The upstream side of the neat Ultem® 1000 film was exposed to this gas mixture at a pressure of 50 psia. The downstream side of the neat Ultem® 1000 was maintained at vacuum, resulting in a differential pressure driving force of 50 psia across the film. With the permeation system maintained at a constant temperature of 35° C., the permeation rate of gases through the membrane was measured with a pressure-rise method and the composition of the permeate gas was analyzed with gas chromatography (HP 6880). Results are shown in Table 3 with the individual gas permeabilities.

TABLE 3

"Neat" Ultem® 1000 Membrane

| Gas Component | Permeability $(10^{-10} \text{ cm}^3 \text{ (STP)} \cdot \text{cm}/ \text{cm}^2 \cdot \text{s} \cdot \text{cm Hg})$ |
| --- | --- |
| $CH_4$ | 0.038 |
| $CO_2$ | 1.49 |

From the permeability values in Table 3, the permeability ratios (selectivity) of the neat Ultem® 1000 membrane film for $CO_2/CH_4$ was 39.2.

A section from the mixed matrix film (15 wt. % H-SSZ-62) in Example 1 was used to measure the permeabilities and separation factor at 50 psia and 35° C. for 10% $CO_2$/90% $CH_4$. Results are shown in Table 4 with the individual gas permeabilities.

TABLE 4

Ultem® 1000 With Super Water Washed Sieves Membrane

| Gas Component | Permeability $(10^{-10} \text{ cm}^3 \text{ (STP)} \cdot \text{cm/cm}^2 \cdot \text{s} \cdot \text{cm Hg})$ |
| --- | --- |
| $CH_4$ | 0.055 |
| $CO_2$ | 2.81 |

From the permeability values in Table 4, the permeability ratios (selectivity) of the mixed matrix membrane for $CO_2/CH_4$ was 51.1. Both the $CO_2/CH_4$ selectivity and $CO_2$ permeability of the Ultem® 1000-H-SSZ-62 mixed matrix membrane, using super water washing, were enhanced over those measured for the neat Ultem® 1000 film.

Comparative Example A

H-SSZ-62 zeolite particles were prepared which were calcined prior to the super water washing step. All the other preparation steps were the same as those described in Example 1 including silanation. The particles were dried in a vacuum oven for 24 hours at 100° C. A mixed matrix membrane was prepared, again using Ultem® 1000 as the polymer matrix phase. As before, this mixed matrix membrane film contained 15 wt. % H-SSZ-62 particles.

Unlike the mixed matrix film prepared in Example 1, the resulting mixed matrix film using these H-SSZ-62 particles had a markedly different morphology and physical appearance, containing numerous, large agglomerates that resulted in a texture similar to that of sandpaper, whereas the mixed matrix film employing the desired super washed H-SSZ-62 particles (Example 1) was physically smooth and free of agglomerates. A section from the film was used in a permeation testing cell to measure the permeabilities and separation factor at 50 psia and 35° C. for 10% $CO_2$/90% $CH_4$.

The permeation rate was not measurable because of its high rate. Further, gas chromatography analysis of the permeate stream indicated no compositional difference from that of the feed mixture.

Comparative Example B

H-SSZ-62 was prepared according to U.S. patent application Ser. No. 2003/0069449 to Zones et al, using ion-exchange to lower metal alkali content as taught in that application. Conventional water washing of the H-SSZ-62 was performed before calcination. Again, these sieves were silanated with APDMES. The sieves were used to prepare a mixed matrix membrane containing 15% zeolite, with PVAc as the polymer. The $O_2/N_2$ selectivity at 50 psia and 35° C. was 6.5. In comparison, a membrane made using the super water washed sieves of Example 1, also containing 5% H-SSZ-62, had an $O_2/N_2$ selectivity at 50 psia and 35° C. of 7.0.

Comparative Example C

The H-SSZ-62 of Comparative Example B, i.e., silanated sieves made without using super water washing, was used to make a 15% zeolite mixed matrix membrane with Ultem® 1000 as the polymer. The membrane was tested for both $O_2/N_2$ and $CO_2/CH_4$ separation. No selectivity enhancement was found at 50 psia and 35° C. over that of the neat polymer.

Example 3

Permeation Testing—PVAc—30 Micro mhos/cm

The H-SSZ-62 zeolite of Example 1, which was silanated, was used to prepare a mixed matrix membrane film using polyvinylacetate (PVAc), with a 15% zeolite loading. Samples of the film were tested for both $CO_2/N_2$ and $O_2/N_2$ permeation, using the pure gases at 50 psi and 35° C. Results are shown, respectively, in FIGS. 1 and 2 with $CO_2/N_2$ selectivity vs. $CO_2$ permeability and $O_2/N_2$ selectivity vs. $O_2$ permeability plotted. The permeability was approximately 5.0 B for $CO_2$ and 0.75 B for $O_2$. The selectivity of this membrane was 51 $CO_2/N_2$ and 6.9 for $O_2/N_2$. For a pure PVAc membrane, $CO_2/N_2$ selectivity was 35 and $CO_2$ permeability was approximately 3.1 B. Similarly, a pure PVAc membrane exhibited an $O_2/N_2$ selectivity of 5.9 and a permeability of 0.52 B.

Comparative Example D

PVAc-110 Micro mhos/cm

Figure 2:
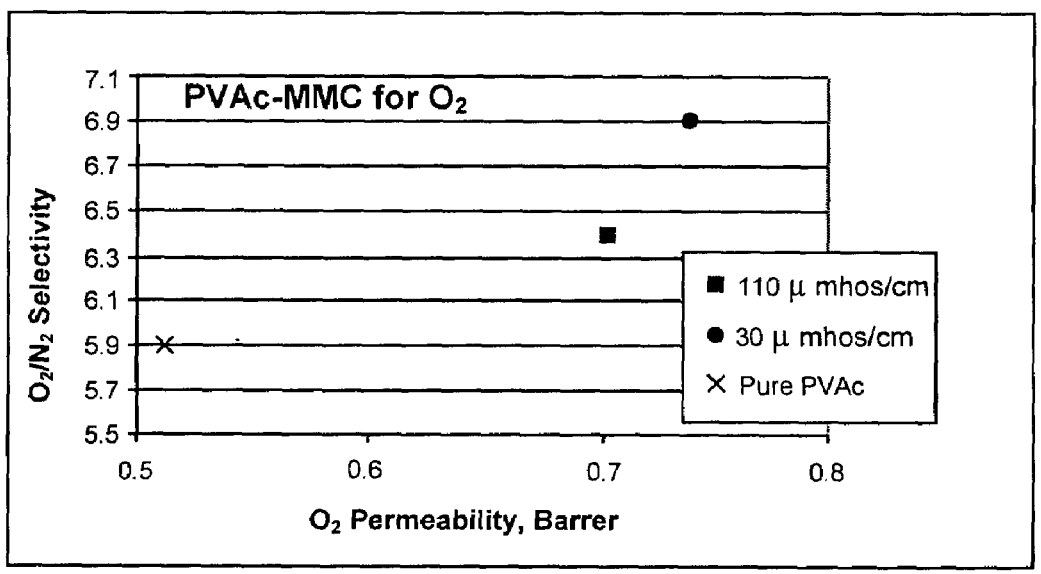
FIG. 2 is a graph of $O_2/N_2$ selectivity vs. $O_2$ permeability for PVAc films without molecular sieves and PVAc-MMC films with ~15% (wt. %) H-SSZ-62 loading.

A portion of the H-SSZ-62 zeolite of Example 1 was removed when the wash water conductivity was 110 micro mhos/cm, and dried, calcined, and silanated as in Example 3. The zeolite was used to prepare a mixed matrix membrane film with 15% zeolite loading in PVAc as in Example 3. $CO_2/N_2$ and $O_2/N_2$ permeation results are shown in FIGS. 1 and 2, respectively. These results show lower selectivity in both cases, 44 and 6.4, than when the sieves were water washed down to 30 micro mhos/cm prior to calcination.

Comparative Example E

Another batch of H-SSZ-62 was prepared similar to that of Example 3, with drying, calcining, and silanating after the wash water conductivity had reached 110 micro mhos/cm. After calcining, the zeolite was exchanged three times with a 10-fold excess of an aqueous solution of $NH_4NO_3$ at 90° C., then calcined at 400° C. This zeolite was silanated using 0.2% aminopropyldimethylethoxysilane (APDMES) in isopropanol/water (95/5 V/V) and dried at 135° C. overnight, followed by one hour at 195° C. Permeation testing as in Example 3 showed an $O_2$ permeability of 0.68 B and a $O_2/N_2$ selectivity of 6.3.

Comparative Example F

A small H-SSZ-62 sample from Comparative Example E was calcined at 590° C. for one hour. The calcined batch was silanated using 0.2% APDMES in isopropanol/water (95:5 V/V) and dried at 135° C. overnight. Permeation testing as in Example 3 showed an $O_2$ permeability of 0.69 B and a $O_2/N_2$ selectivity of 6.5. For $CO_2/N_2$, the selectivity was 44.2.

Comparative Example G

A portion of the as-synthesized zeolite of Example 3 was worked up as in that example, except the zeolite was calcined at 593° C. after the conductivity was reduced to 110 micro mhos/cm and prior to the further water washing which lowered conductivity to less than 30 micro mhos/cm. The zeolite was also silanated. The zeolite was evaluated in the Mixed Matrix Membrane Enhancement Test. Agglomeration of the zeolite in forming the membrane contributed to no enhancement in the $CO_2/CH_4$ selectivity. While in the foregoing specification this invention has been described in relation to certain preferred embodiments thereof, and many details have been set forth for purpose of illustration, it will be apparent to those skilled in the art that the invention is susceptible to alteration and that certain other details described herein can vary considerably without departing from the basic principles of the invention.

What is claimed is:

1. A method for preparing silica containing molecular sieves which may be mixed with an organic polymer to create a mixed matrix membrane, the method comprising:
   washing silica containing molecular sieves with a basic water solution having a pH of at least 9; and
   water washing the silica containing molecular sieves sufficiently to produce water washed molecular sieves which are substantially free of surface remnants, such that when the water washed molecular sieves are subjected to a Sieve Wash Conductivity Test, a wash filtrate is produced having a conductivity of less than 110 micro mhos/cm.

2. The method of claim 1, wherein: the conductivity is less than 80 micro mhos/cm.

3. The method of claim 1, wherein: the conductivity is less than 50 micro mhos/cm.

4. The method of claim 1, wherein: the conductivity is less than 30 micro mhos/cm.

5. The method of claim 1 wherein: the basic water solution has a pH of at least 11.

6. The method of claim 1, wherein: the water washing is performed continuously until the silica containing molecular sieves are substantially free of the surface remnants.

7. The method of claim 1, wherein: the water washing is performed batch wise until the silica containing molecular sieves are substantially free of the surface remnants.

8. The method of claim 1, further comprising: calcining the silica containing molecular sieves after the step of water washing has produced sieves which are substantially free of surface remnants.

9. The method of claim 1, further comprising: silanating the water washed silica containing molecular sieves.

10. A method of making a mixed matrix membrane, the method comprising the steps of:
    washing silica containing molecular sieves with a basic water solution having a pH of at least 9;

water washing the silica containing molecular sieves sufficiently to produce water washed molecular sieves which are substantially free of surface remnants, such that when the water washed molecular sieves are subjected to a Sieve Wash Conductivity Test, a wash filtrate is produced having a conductivity of less than 110 micro mhos/cm;

dispersing the water washed molecular sieves into a solvated organic polymer; and allowing the organic polymer to dry thereby creating a mixed matrix membrane comprising an organic polymer with the water washed molecular sieves dispersed therein.

11. The method of claim 10 wherein, the wash filtrate has a conductivity of less than 80 micro mhos/cm.

12. The method of claim 10 wherein, the wash filtrate has a conductivity of less than 50 micro mhos/cm.

13. The method of claim 10 wherein, the wash filtrate has a conductivity of less than 30 micro mhos/cm.

14. The method of claim 10, further comprising the step of calcining the water washed silica containing molecular sieves.

15. The method of claim 10, further comprising the step of silanating the water washed silica containing molecular sieves.

* * * * *